Sept. 4, 1951        C. E. IVES        2,566,568
CORN CUTTER
Filed April 30, 1948
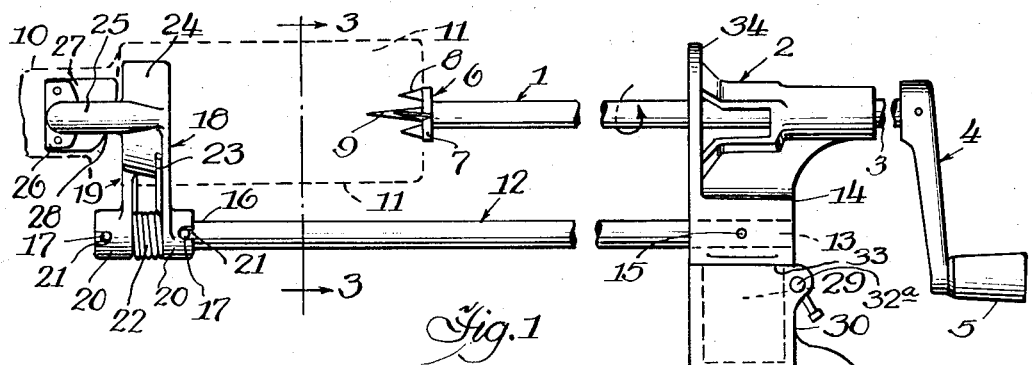
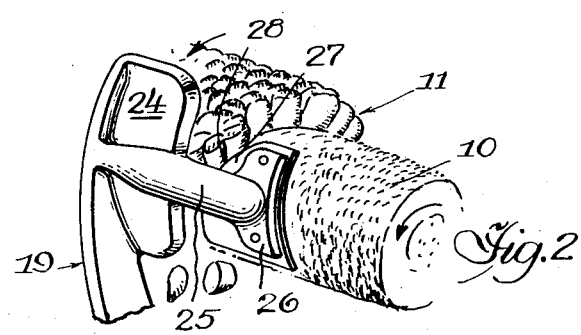
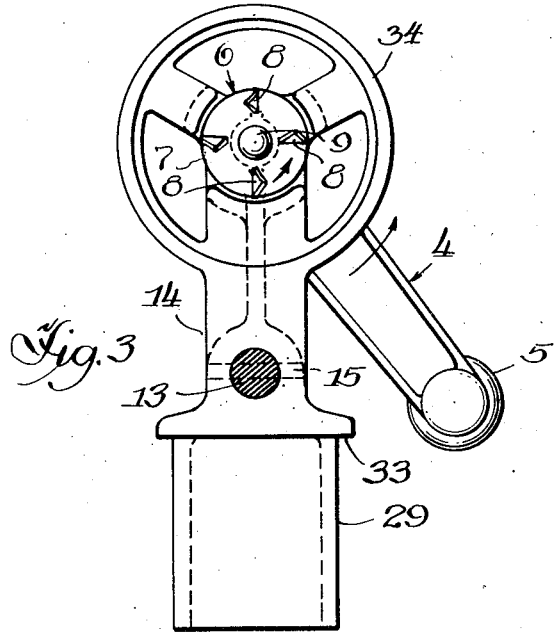
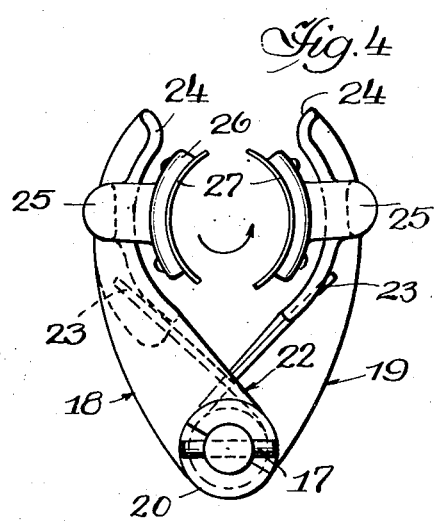
INVENTOR.
Clifford E. Ives,
BY Carl F. Geppert
Atty.

Patented Sept. 4, 1951

2,566,568

UNITED STATES PATENT OFFICE 2,566,568

CORN CUTTER

Clifford E. Ives, Wilmette, Ill., assignors to Sears, Roebuck and Co., Chicago, Ill., a corporation of New York Application April 30, 1948, Serial No. 24,169

2 Claims. (Cl. 130—9)

The present invention relates to a corn cutter and especially to a novel means and mechanism for quickly and most effectively cutting the kernels of corn from the cob.

Among the objects of the present invention is the provision of a novel corn cutting device that automatically adjusts itself to receive an ear of corn, and provided with novel cutting blades and guide means resiliently mounted in opposed relation and so constructed and arranged as to automatically conform to the contour of the cob of each ear of corn and effectively and cleanly cut or shear the kernels from the cob.

The present invention further comprehends a novel assembly including a longitudinally slidable and rotatable crank shaft journalled in a stationary support, this shaft having a crank handle at one end and a drive spur at the other end provided with spurs or pointed projections adapted to be embedded in the end of an ear of corn and with the shaft longitudinally slidable to accommodate ears of varying lengths.

Another important feature of the present invention is the provision of a novel guide and cutting blade assembly comprising a pair of spring-actuated arms each provided with a guide and cutting blade so constructed, arranged and contoured that the blades engage and partially encompass the cob of an ear of corn and as the ear is rotated and moved longitudinally of the cob by the crank shaft and handle, the blades cut or sever the kernels at their base from the cob circumferentially as well as longitudinally thereof until all of the kernels have been so cut or removed. By reason of the novel spring mounting of the blades and guides, these blades are always maintained closely adjacent the cob and the complete kernels are thus removed from the entire cob.

The invention further comprehends a novel construction and combination in a portable corn cutter assembly designed primarily for home use and which may be readily mounted upon the edge of a table or other support.

Another object of the present invention is the provision of a uniform standardized base clamp which can be used for supporting a series of kitchen devices of this character.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in side elevation of the novel corn cutter assembly.

Fig. 2 is an enlarged fragmentary view in perspective of one of the arms and its attached guide and cutting blade and showing the manner of cutting the kernels from the cob, the view being taken from the side of the device opposite to that shown in Fig. 1.

Fig. 3 is an enlarged sectional view of the crank shaft, its support and associated parts, the view being taken in a plane represented by the line 3—3 of Fig. 1.

Fig. 4 is a view in end elevation of the blade and guide assembly.

Referring more particularly to the illustrative embodiment of the portable corn cutter assembly shown in the drawing, the novel assembly comprises a crank shaft 1 slidably journalled in a support 2, the outer end 3 of the shaft projecting through the support, and to this end is pinned a crank arm 4 having a handle 5 for manual operation. To the other or inner end of the crank shaft is suitably affixed or pinned a drive spur 6 including a disc or base 7 from which project spaced spurs 8 and an elongated pointed shank 9 projecting beyond the spurs and with the point and spurs adapted to be embedded in the cob 10 at the stem end and which is generally the larger end of an ear of corn 11. The spurs 8 are disposed at an angle with the longitudinal axis of the crank shaft and in a direction forwardly of the direction of turning so that as the cob is driven these spurs will tend to screw or embed themselves more deeply into the cob and provide a more effective driving means.

While it seems natural to embed the spurs 6 into the stem end of the cob, many cobs have imperfections caused by corn borers and the like which must be removed by trimming. My device anticipates this and kernels are removed from imperfect, trimmed and curved ears with the spurs inserted into either end just as effectively as though they were perfect and straight ears.

A supporting bar or rod 12 is shown disposed below the crank shaft which has one end 13 projecting into an opening provided in the lower part or base 14 of the support 2 and secured therein by a pin 15. The other end 16 of this bar is provided with spaced pins 17 projecting therethrough and with the exposed ends adapted to retain upon the supporting bar 12 a pair of opposed arms 18 and 19, each forming part of a blade and guide assembly. Each arm is provided with a hub 20 through which projects the forward end of the supporting bar 12 and each hub is notched at 21 at the opposite sides thereof for receiving the projecting ends of the pins or projections 17. A coil spring 22 encompasses the inner, reduced ends of the hubs with the ends 23 of the spring engaging the curved or arcuate guides 24 on and projecting from the upper ends of the arms 18 and 19. Each of these arcuate guides is formed or provided with a lateral projection 25 extending parallelly to the crank shaft 1 and formed at its outer end with an arcuate plate 26 providing a base or support for a knife or blade 27 having a curved cutting edge 28. The ends 23 of the coil spring 22 urge the arms 18 and 19 towards each other about the supporting bar and thereby force the cutting knives or blades 27 inwardly against the cob 10 of the ear of corn 11. Due to this resilient mounting of the knives or blades and their supporting arms, they follow the contour of the substantially rigid cob 10 and thereby sever the kernels close to the cob and in a spiral path around the cob as the crank 5 is turned and the crank shaft 1 is forced longitudinally toward the knives or blades while turning.

The support 2 is provided with a depending post or collar 29 receivable in the socket 30 of a base clamp or pedestal 31 adapted to be mounted upon any substantially flat ledge or supporting surface such as a table top, and retained in place by a clamping screw 32. To secure the corn cutter assembly in the base clamp or pedestal 31, the upper end 30 thereof is slit so that it may be tightly clamped about the neck or collar 29 by a clamping screw 32ª. A shoulder 33 at the upper end of the post 29 seats upon the upper edge of the socket 30. This base clamp may be employed as a support for a series of kitchen devices or utensils.

To insert an ear of corn, the cob 10 at the larger end of the ear 11 receives the spurs 8 and center point 9. Preferably, the crank shaft is withdrawn to the limit of its movement whereby the spur is retracted into the cupped portion formed by the peripheral flange 34 on the support 2. In this position insertion of the stem or larger end of the ear automatically centers the ear so that it becomes a simple matter to embed the point 9 and spurs 8 into the end of the cob 10 while the latter is centered. Also, in this retracted position the point 9 and spurs 8 lie wholly within the peripheral flange 34 which forms a protective guard and prevents injury to the operator.

After the cob is so anchored at one end the crank shaft is moved longitudinally outwardly and toward the cutters until the other or normally smaller end of the ear of corn is disposed between and partially encompassed by the guide arms 18 and 19 and with the guides 24 engaging the outer circumference of the end of the ear. After the ear is so located, the crank handle 5 is rotated and the cutting edges 28 of the knives or blades 27 disposed inwardly of the guides 24 follow the contour of the cob in a spiral path and cleanly cut or sever the kernels close to the cob. Continuous rotation and axial or longitudinal pressure on the handle and crank shaft forces the ear past the knives or blades, and with the cutting edges contoured in the manner disclosed the kernels are quickly cut from the entire circumference of the cob.

From the above description and the disclosure in the drawing, it will be readily appreciated that the invention comprehends a novel portable corn cutter of simple and efficient construction and one that may be maintained sanitary with a minimum of effort. After locating and locking the support 2 in any desired position in the socket 30 of the base clamp 31, it is a simple matter to install an ear of corn in the device in centered position and without danger to the operator.

Having thus disclosed the invention, I claim:

1. A device for cutting the kernels from the cob of an ear of corn, comprising a supporting member; a cupped enlargement on said supporting member adapted to receive and center an ear of corn, a crank shaft journalled in said member for rotation and axial movement, a crank arm on one end of said shaft for rotating and moving the latter axially, sharp projections carried on the other end of the crank shaft adapted to be embedded in and retain an end of the ear, tensionally mounted guide arms disposed at the opposite sides of the ear and each provided with a knife adapted to follow the contour of the cob and cut the kernels therefrom circumferentially and axially as the shaft and ear are rotated and moved relative to the knives, the end of the shaft and said projections being adapted to be withdrawn into the cupped enlargement when the ear is initially mounted in position and to protect the operator when the end of the ear is inserted into the cupped enlargement and the shaft moved axially to embed the projections into said end.

2. An apparatus for cutting kernels from ears of corn comprising, an anchor fixture in which are provided two parallel bores, a crank shaft for turning a cob of corn journaled and slidable in one of said bores, a support beam comprising a cylindrical rod secured in the other of said bores, and a pair of opposed corn kernel cutting members formed with hubs rotatably mounted on said beam and pivotally carried at the remote end of said beam, said hubs having radially cut out segments through which limiting pins carried by said beam protrude for the purpose of confining the angles of rotation within which said cutting members move, and a spiral torque spring encircling said beam and being confined intermediate said cutting members for imparting a yieldable force to urge said members towards each other and thereby into cutting engagement with the kernels of an ear of corn as it is advanced and rotated by said crank shaft.

CLIFFORD E. IVES.

REFERENCES CITED

The following references are of record in the file of this patent:

UNITED STATES PATENTS

| Number | Name | Date |
| --- | --- | --- |
| Re. 4,036 | Bowles | June 21, 1870 |
| 14,855 | Coates | May 13, 1856 |
| 57,361 | Morley | Aug. 21, 1866 |
| 240,052 | Stover | Apr. 12, 1881 |
| 247,511 | Nesbitt | Sept. 27, 1881 |
| 1,127,548 | Turner | Feb. 9, 1915 |
| 1,451,776 | Japuette | Apr. 17, 1923 |
| 1,579,511 | Burpee | Apr. 6, 1926 |
| 2,493,588 | Martin | Jan. 3, 1950 |